United States Patent Office 3,046,026
Patented July 24, 1962

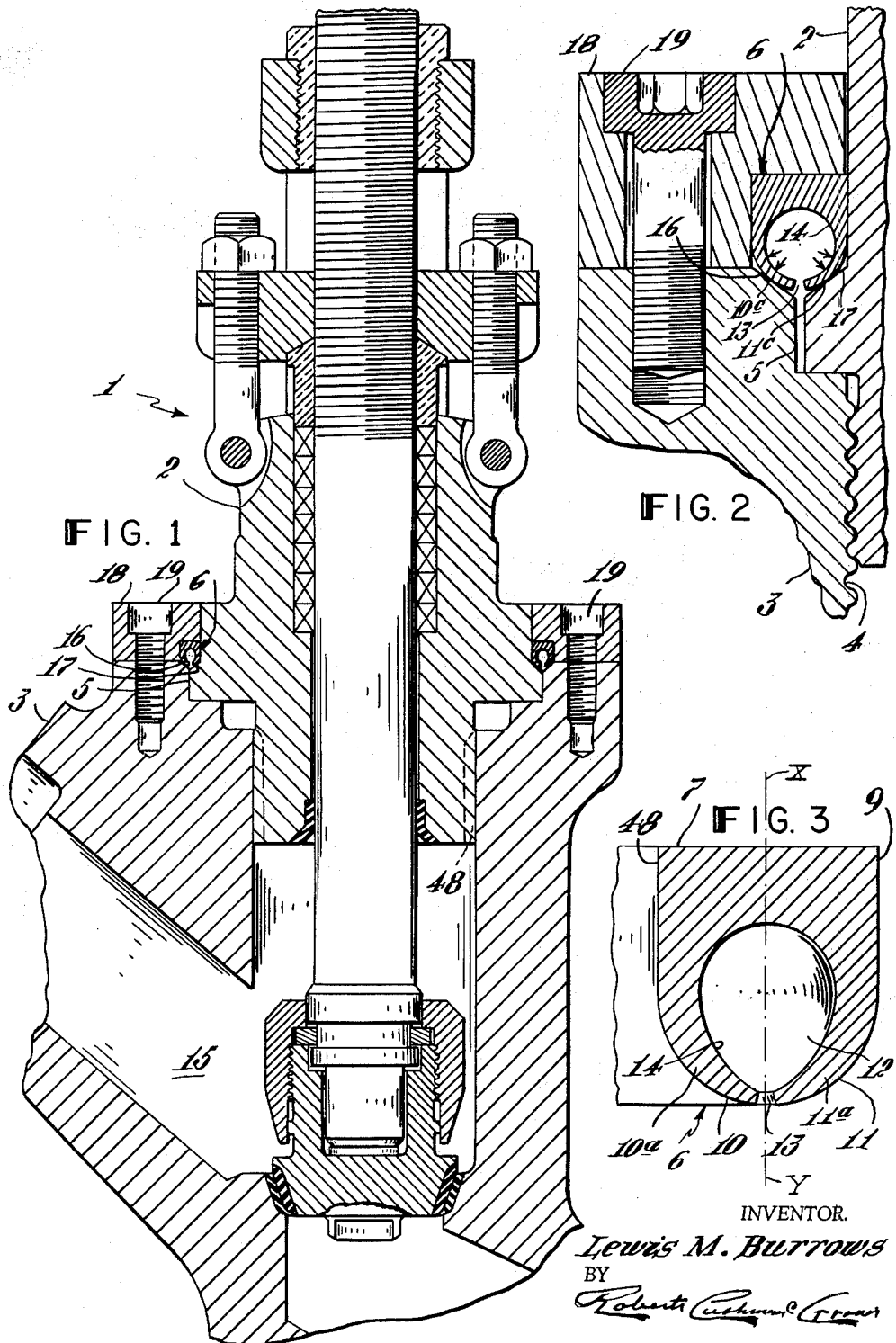

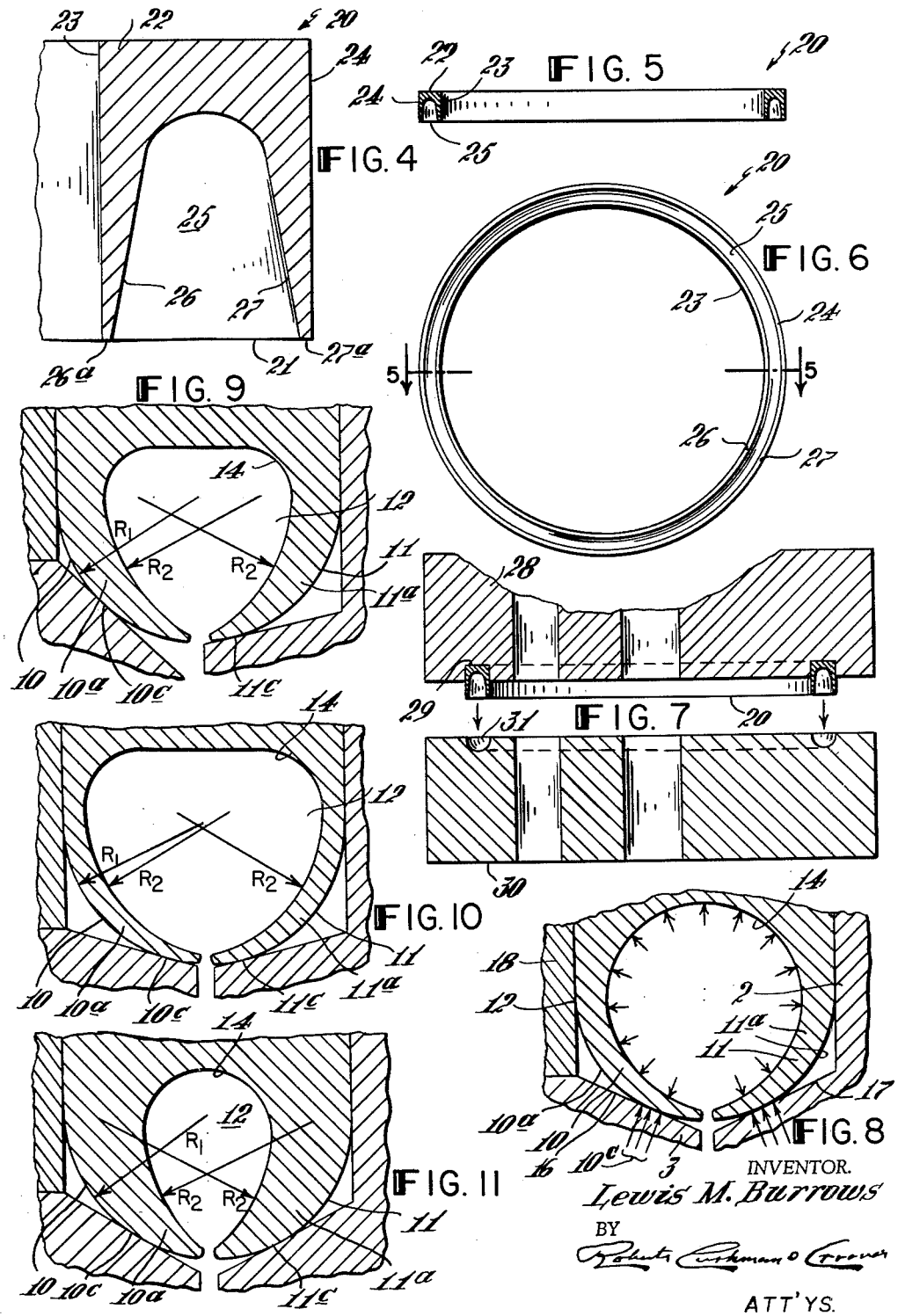

3,046,026
HIGH PRESSURE SEAL
Lewis M. Burrows, North Quincy, Mass., assignor to Manning, Maxwell & Moore, Incorporated, New York, N.Y., a corporation of New Jersey
Filed Oct. 22, 1958, Ser. No. 768,888
13 Claims. (Cl. 277—171)

The present invention relates to a sealing device for use in sealing a joint between assembled parts, e.g., the joint between the bonnet and body of a valve, and relates more especially to a seal for use in sealing a joint in apparatus designed to store or conduct fluids at high pressures; and in particular, fluids whose escape, even in small amounts, might be dangerous to personnel or surroundings.

Various types of joint intended to provide complete sealing have been employed, among them flanged joints with gaskets, flanged joints with welded lips, and straight welded joints. However, flanged joints have proven undesirable, particularly in large installations, because of their inordinate bulk and weight. Similarly, gasketed joints, which depend for their effectiveness upon the inherent resiliency of the gasketing material utilized, are limited as to the pressures they are effective to confine. Welded joints, although positively leak-tight and of light construction, cannot be conveniently separated, requiring cutting or abrasion of the weld, with attendant expense and delay, to separate assembled parts so sealed. Separation of a welded joint, also often results in permanent injury to the parts so separated.

Sealing of joints is further complicated by the reaction of the sealing device and of the assembled parts constituting the joint to be sealed to high or varying temperatures. In addition, the sealing of joints requires that a sealing device be effective both at the high pressures for which it is designed and for the low pressures which may be encountered, at times, during operation of the apparatus being sealed, e.g. when said apparatus is being started into operation.

Objects of the present invention are to provide a sealing device which will seal a joint between assembled parts as effectively as welding but which leaves said parts easily separable; which provides a joint which is light and compact; which provides a joint not adversely affected by high or widely varying temperatures; which insures effective sealing against high and low pressures; which may be designed for use in any size joint in various types of apparatus; whose effectiveness automatically increases in proportion to increase in the fluid pressure to which it is exposed; which is adapted for use in sealing a joint between parts in screw-threaded engagement but which is independent of the amount of relative movement between said parts; and to provide a method of constructing a seal having the above-noted features which is simple and inexpensive.

The sealing device according to this invention comprises a seal having a surface open to the joint to be sealed for exposure of said surface to the pressurized fluid tending to leak through said joint, and having a surface or surfaces of lesser combined area than said exposed surface for contacting the assembled parts constituting the joint to seal said joint. The seal is designed so that the pressure exerted on said exposed surface by said pressurized fluid is translated through the seal to seat said seal-contacting surfaces against the assembled parts constituting the joint, whereby since the area exposed to the pressurized fluid is greater than the combined area of said contacting surface or surfaces, said contacting surfaces will always be seated with greater pressure than the pressure of the fluid which the seal confines.

In its more specific aspects, the sealing device of the present invention comprises a ring having an internal annular recess which is, in part, defined by two resilient, annular, oppositely directed lips integral with and collectively forming one end face of the ring, this recess being of substantially toric configuration, the free edges of said lips being spaced apart to provide a narrow slot providing an entrance to the recess, so that when the ring is positioned over a joint to be sealed, with said entrance slot registered with the joint, any pressure fluid which leaks through the joint will enter the recess and will exert outwardly directed force against all portions of the recess surface. The resilient lips have convex arcuate external surfaces, and when the seal is placed over a joint between parts provided with seal-seating faces at opposite sides respectively of the joint, said arcuate convex surfaces will tangentially contact the seal-seating faces.

Because of the tangential contact of the lips with the seal-seating surfaces, the area of such contact approximates a geometric line in width, and since the recess surface, which is exposed to fluid pressure, is of much greater area than the aggregate of said very narrow contact areas, a unit pressure is developed between said lips and the seal-seating surfaces which is substantially greater than the fluid pressure to which the joint is subjected. One of the assembled parts, between which the joint is formed, has means attached thereto for applying mechanical force to the sealing ring for preloading said ring sufficiently to provide a leak-tight contact of the lips with the seal-seating surfaces during periods when the fluid pressure, to which the joint is subjected, is insufficient, of itself, to press the lips into sealing contact with the seal-seating surfaces.

Other and further objects, advantages and details of construction of the invention will be pointed out in the following more detailed description and by reference to the accompanying drawings wherein:

FIG. 1 is a vertical section through a valve of generally conventional type on the plane of the axis of the valve stem and illustrating the employment of a seal, according to the present invention, for sealing the joint between the valve body and bonnet;

FIG. 2 is a diagrammatic vertical radial section, to larger scale than FIG. 1, showing two parts united by screw threads and with sealing means, according to the present invention, arranged to seal the joint between these parts;

FIG. 3 is a fragmentary radial section, to still larger scale, showing a sealing ring, made in accordance with the present invention, as it appears before installation for sealing a joint;

FIG. 4 is a fragmentary radial section showing a sealing ring, such as that of FIG. 3, at an intermediate stage in the process of making it;

FIG. 5 is a diametrical section, to smaller scale than FIG. 4, showing the same embryo ring as that of FIG. 4;

FIG. 6 is an end view of the ring of FIG. 5;

FIG. 7 is a diametrical view through a two-part die such as may be employed in transforming a ring, such as shown in FIG. 4, to the shape of the ring shown in FIG. 3;

FIG. 8 is a diagrammatic view showing a sealing ring, embodying the present invention, installed in a suitably shaped recess for sealing a joint between parts and illustrating the principle of operation of the sealing ring of the present invention;

FIG. 9 is a fragmentary section, similar to that of FIG. 8, illustrative of dimensional relationships such as are desirable in a sealing ring employed for pressures of the order of twenty-five hundred pounds per square inch;

FIG. 10 is a similar view showing relative dimensions of a low pressure ring, for example for use with pressures of the order of three hundred pounds per square inch; and FIG. 11 is a similar section, but showing relative dimensions of a ring employed for high pressure, for example pressures of the order of twenty-five thousand pounds per square inch.

Referring then to the drawings, 1 indicates a valve of generally conventional type having the valve bonnet 2 and the valve body 3 in screw-threaded engagement, as at 4, and having the joint 5 sealed according to this invention by the sealing device 6.

The sealing device 6 (FIG. 3), selected for illustration, comprises a ring 20 of stiffly resilient material having a flat annular face 7 (FIG. 3) and two concentric cylindrical peripheral faces 8 and 9, respectively, which merge with the outer peripheral surfaces 10 and 11, respectively, of opposed resilient lips 10a and 11a, integral with the ring proper. The ring has an internal recess or chamber 12 of substantially toric configuration, the inner peripheral surfaces of the lips 10a and 11a forming portions of this surface. The opposed free edges of these lips are spaced apart to provide between them a narrow annular slot 13 providing an entrance to the recess or chamber. As here illustrated, the radius of the upper portion of the recess is of the order of one-third the radial thickness of the ring, and thus the inner surface 14 of the recess is of substantial area. The exterior surfaces 10 and 11 of the lips 10a and 11a are convex and arcuate at any radial section of the ring. As thus contoured, any radial section of the ring is symmetrical about a line X—Y (FIG. 3) perpendicular to the face 7 and bisecting the slot 13.

When such a sealing ring 6 is installed, as shown in FIG. 1, between the valve body 3 and its bonnet 2 and with the entrance slot 13 of the ring registered with the joint 5 between the valve body and bonnet, any fluid, which leaks from the chamber 15 of the valve body along the screw threads at 4 and enters the joint 5, will pass through the slot 13 into the recess 12, where it will exert substantially uniform pressure over the entire area of the recess surface 14. The outward force exerted on the recess surface 14 by the fluid pressure tends to straighten the resilient lips 10a and 11a and so cause their outer convex surfaces 10 and 11 to press against the substantially conical seal-seating faces 16 and 17 (FIG. 8) of the body and bonnet, respectively. Since the ring is symmetrical at any radial section, the internal pressure will deform the lips 10a and 11a to the same amount and thus cause them to press with equal force against the seating faces 16 and 17 respectively. As above noted, these seal-seating faces 16 and 17 of the valve parts are so sloped as tangentially to engage the convex arcuate outer surfaces of the lips 10a and 11a. As here shown, the faces 16 and 17 are relatively inclined at an obtuse angle, preferably forming an included angle of approximately 120°, and desirably, these faces make equal angles with the plane of the joint 5. With this arrangement, the faces 16 and 17 theoretically make only a line contact with the outer surfaces 10a and 11a of the lips, and though the actual contact may be of a width exceeding a geometrical line, nevertheless the actual contact areas, which are annular and concentric with the ring, are very small in the aggregate as compared with the surface 14 of the recess or chamber 12 on which the pressure fluid acts. Thus, the pressure, applied substantially uniformly over the relatively large internal area 14 of the recess or chamber 12, acts upon the resiliently deformable lips 10 and 11 with force sufficient to seat the outer faces of both of said lips 10a and 11a against the faces 16 and 17 with a unit pressure which is substantially greater than the unit fluid pressure on the recess surface 14. Therefore, the effective pressure, seating the sealing device of this invention against the parts between which leakage tends to occur, will always be greater than the fluid pressure in the valve or vessel which the sealing device serves to render leakproof. Since the sealing lips 10a and 11a are resilient, the seating of said lips will be uniform along the entire annular contact areas.

As shown in FIGS. 1 and 2, a preloading ring 18 is secured in place by screws 19 having threaded engagement with the valve body 3. This ring provides means for applying external mechanical pressure to the sealing ring 6 by the tightening of the screws 19. As here shown, this loading ring has an annular recess which receives the sealing ring, the upper horizontal face of this recess bearing against the upper flat surface 7 of the sealing ring. By making the recess in the loading ring of the proper vertical depth, a predetermined preliminary, mechanical pressure may be applied to the sealing ring, when the screws 19 are tightened, such as to seat the contact surfaces 10 and 11 of the lips against the faces 16 and 17 with force sufficient to seal the joint 5 against leakage of relatively low fluid pressure from the chamber 15. Thus, the joint is sealed even when pressure fluid in the valve chamber 15 is insufficient, of itself, to flex the lips 10a and 11a to provide a tight joint. Thus, the sealing device of this invention provides efficient sealing against relatively low fluid pressures, and also serves as a high pressure seal which automatically increases in effectiveness as the fluid pressure to which it is exposed increases.

It will be noted that the resilient lips of the sealing ring recess herein illustrated are tapering in radial section, being more narrow near the slot 13 so that the transverse stiffness of the lips increases progressively from their tips, that is, from the slot 13. This construction insures maintenance of narrow annular contact surfaces 10c and 11c, whether the ring be seated by the action of the pre-load ring 18; by a relatively low fluid pressure in recess 12; or by high fluid pressure within the recess 12.

It will be noted that the sealing device of this invention may be designed for use in sealing a joint of any size, and may be adapted to seal a joint against widely varying ranges of fluid pressure. FIGS. 9–11 illustrate the general configurations of sealing rings, as shown in radial section, for use in sealing joints which are subjected to various ranges of fluid pressures. As is indicated in these figures, by varying radii R1 and R2, variables, such as recess surface area 14, contact surface areas 10c and 11c, and the size and taper of the resilient lips 10a and 11a, may be interrelated to provide optimal sealing for various fluid pressures. Relatively speaking, the ring of FIG. 10 might be satisfactory for a pressure up to 300 p.s.i.; the ring of FIG. 9, for 2500 p.s.i.; and the ring of FIG. 11, for 25,000 p.s.i.

Any suitable stiffly resilient material capable of withstanding high temperatures may be utilized in this sealing ring, but, since the greatest utility of this sealing ring lies in its use as a high pressure seal, a ring, preferably of steel, is employed as having the desired strength as well as suitable resilience. In addition, steel rings will be relatively unaffected by the high or varying temperatures to which the rings may be exposed.

The sealing ring of this invention may be adapted for use in many types of apparatus such as valves, pumps, heat exchanges and condensers, handhole and manhole covers, and flare-tube couplings. The seal may also be adapted for use in sealing joints between parts which are in screw-threaded engagement with independence of the relative movement of said parts. The sealing ring may also be adapted to provide the lips 10a and 11a and the recess 12 on other of the peripheral faces of said ring than those shown. Thus, the lips may turn in from the end faces of the ring to form a recess on the inner periphery thereof opposite the face 9 on the ring as here shown. Similarly, the pre-load ring 18 may be integral with one or another of the assembled parts forming the joint to be sealed. Likewise, the pre-load ring may be obviated by integrating the sealing ring itself to one or another of said assembled valve parts.

It will be noted that, since the ring 6 is compressed only slightly by the pre-load ring 18, the joint 5 may be easily separated whenever desired, and, since the ring 6 is only slightly deformed by the compression exerted by the pre-load ring and by the high fluid pressure to which it is subjected, the ring 6 should be reuseable any desired number of times.

FIGS. 4 to 7 illustrate a novel method of making a sealing ring such as above described. Desirably, as a first step in this procedure, a hollow cylinder of the desired material, and having the internal and external diameters of the desired sealing ring, is provided; and while this cylinder is held in a rotating chuck, its exposed end is machined to form a groove of approximately the shape shown at 25 (FIG. 4). After forming this groove, a length of the cylinder, sufficient to form a ring of the desired axial thickness, is cut off, thus providing the embryo ring 20 (FIGS. 5 and 6). This embryo ring 20 has two concentric peripheral faces 23 and 24; the flat end face 22; and the groove 25 at the opposite end from the flat face, this groove having the inner surfaces 26 and 27 (FIG. 4). The ring 20 is then placed in a swaging block 28 (FIG. 7) having an annular channel 29, rectangular in radial section, adapted to receive the embryo ring 20, with the face 22 of the ring contacting the inner wall of the channel. The channel 29 is of such depth as to accommodate the body of the ring 20, while leaving the grooved end face 21 thereof projecting from the block. A die 30, having an annular channel 31, semi-circular in radial section, and which is adapted to receive the concentric edges 26a and 27a (FIG. 4) of the walls of the groove 25 of the ring 20, is aligned with the block 28 by conventional positioning means; and the block 28 is then advanced toward the die while guided by said positioning means, thereby contacting the edges 26a and 27a with the curved wall of the channel 31 of the die. The walls of this channel 31, by contact with the edges 26a and 27a, turns them inwardly, thus forming the lips 10a and 11a of the desired ring.

It should be understood that the present disclosure is for the purpose of illustration only and that this invention includes all modifications and equivalents which fall within the scope of the appended claims.

I claim:

1. A device for sealing an annular joint in a pressure fluid container, said device comprising a stiffly resilient metallic ring coaxial with said joint and having an annular internal chamber to which the pressure fluid is admitted when the device is in use, said ring having resilient annular lips whose edges are opposed and which define an annular entrance slot in a plane perpendicular to the axis of the ring, the inner surfaces of said lips defining portions of the wall of said chamber, said lips having convex external surfaces for contacting annular seal-seating surfaces at opposite sides respectively, of said joint, thereby to seal the joint, the ring being of symmetrical contour at any radial section, and the aggregate of the areas of contact between said external contacting surfaces and said seating surfaces being less than said internal surface, whereby the fluid pressure, acting on said internal surface, will be translated through the substance of said resilient lips and force said contacting surfaces against the seal-seating surfaces of said joint with a unit pressure exceeding the fluid pressure.

2. A device for sealing an annular joint through which pressure fluid tends to leak, said device comprising a stiffly resilient metallic ring having an annular interior chamber, the ring being of such shape in radial section as to have two like resilient lips having spaced edges defining between them an entrance slot coaxial with the joint, through which pressure fluid may enter the chamber when the ring is in use, the ring having a flat annular face diametrically opposite to said slot and in a plane perpendicular to the axis of the joint, the ring, at any radial section, being symmetrical with respect to a line perpendicular to said flat face and which bisects said entrance slot, said lips having exterior surfaces located at opposite sides respectively, of said entrance slot, and which are designed to contact seal-seating surfaces at opposite sides respectively, of said joint, to seal the joint, the aggregate of the areas of contact between said contacting surfaces of the lips and said seal-seating surfaces being less than the area which is exposed to said pressure fluid within said chamber, whereby fluid pressure, acting on said area of the chamber, will be translated through the substance of said resilient lips to force said contacting surfaces against the seal-seating surfaces of said joint with a unit pressure exceeding the fluid pressure.

3. A device according to claim 2, further characterized in having means for applying mechanical force to said flat face of the ring in a direction parallel to the axis of the ring.

4. A device for sealing an annular joint in a pressure fluid container, including a stiffly resilient metallic ring comprising integral, resilient, inturned lips which collectively define portions of the walls of an internal chamber of substantially toric configuration, the adjacent edges of said lips being opposed to each other and free to flex away from each other and being spaced to provide an entrance slot, coaxial with the point, through which pressure fluid may enter the chamber, each of said lips having a convexly curved, external surface for contacting seal-seating surfaces at opposite sides of said joint thereby to seal the joint, the ring being symmetrical, at any radial section, with respect to a line parallel to the axis of the ring and which bisects the entrance slot, the aggregate of the areas of contact between said contacting surfaces of the lips and said seal-seating surfaces being less than the area of the chamber which is exposed to fluid pressure, whereby fluid pressure within said chamber will be translated through the substance of said resilient lips and force said contacting surfaces against the respective seal-seating surfaces with a unit pressure exceeding the fluid pressure.

5. A seal for preventing leakage through an annular joint between independent, assembled parts of a container for pressure fluid, and having means for applying mechanical force for drawing said parts into contact, one of said assembled parts having an external seal-seating surface adjacent to said joint and another of said assembled parts having an external seal-seating surface at the opposite side of said joint, and a unitary, stiffly resilient sealing ring comprising inturned resilient lips collectively forming parts of the wall of an annular interior chamber concentric with the ring and of substantially toric configuration, each lip being arcuate in radial section and externally convex, the adjacent edges of the lips being spaced apart to provide an annular entrance slot opening into said chamber, the ring being positioned over the joint with its entrance slot registering with the joint whereby pressure fluid, leaking through the joint, may enter the chamber, and the ring being symmetrical at any radial section with respect to a line parallel to the axis of the ring and bisecting the entrance slot, the outer faces of said arcuate lips tangentially contacting said seal-seating surfaces over a combined area less than the area of the chamber which is exposed to the fluid pressure, whereby fluid pressure within the chamber, being translated through the substance of said resilient lips, forces the external faces of said lips against said sealing surfaces with a unit pressure exceeding the fluid pressure.

6. A seal according to claim 5, wherein the ring has a flat annular face diametrically opposite to said entrance slot, and supplementary means for applying mechanical force to said flat face of the sealing ring such as to insure a unit sealing pressure of said lips against the sealing surfaces even though the fluid pressure be too low to create such sealing pressure.

7. A seal according to claim 6, comprising a third part and mechanical means for forcing it against the sealing ring, thereby to create a predetermined minimum unit pressure between the lips and said seal-seating surfaces regardless of the fluid pressure.

8. A high-pressure sealing device for sealing a joint between two relatively movable rigid parts of the wall of a metallic pressure vessel designed to contain high pressure fluid, connecting means whereby said parts may be drawn together into metal-to-metal contact, said parts having external seal-seating surfaces located respectively, at opposite sides of the joint, and wherein a stiffly resilient metallic sealing ring contacts both of said seal-seating surfaces, said ring having an internal annular chamber whose wall is defined, in part, by annular lips which are integral portions of the ring and which freely flex away from each other in response to a sufficiently high fluid pressure within said interior chamber, each lip being externally convex and tapered in thickness, the free edges of the lips being opposed to each other and spaced to provide a narrow, annular slot, concentric with the joint and in a plane perpendicular to the axis of the ring, through which pressure fluid, leaking through the joint between said vessel parts, may enter the chamber in the ring and thereby flex said lips so that the outer convex face of each lip makes a tangential line contact with one of the respective seal-seating surfaces of the pressure vessel parts, thereby establishing a unit pressure at said tangent lines exceeding the pressure of the fluid medium, and a preloading device, movable relatively to said vessel parts, which is operative to apply mechanical force to the sealing ring in a direction parallel to the axis of the ring, so as to establish sealing contact between the lips and said seal-seating surfaces of the pressure vessel parts, even though the fluid pressure against which the joint is to be sealed is insufficient, of itself, to flex the stiffly resilient lips of the ring to provide a tight joint.

9. A high-pressure sealing device for sealing an annular joint between two independent rigid parts which are normally fixed relatively to each other and which constitute portions of the wall of a pressure vessel designed to contain high-pressure, high-temperature fluid, means for applying mechanical force whereby said parts may be drawn into metal-to-metal contact such as to minimize the width of the joint between them, said parts having concentric seal-seating surfaces external to both parts and located respectively, at opposite sides of the joint, and wherein a stiffly resilient metallic sealing ring contacts both of said seal-seating surfaces, said ring being coaxial with the joint and having an internal annular chamber whose wall is defined, in part, by annular lips which are integral portions of the ring, and which are free to flex away from each other in response to a sufficiently high fluid pressure within said interior chamber, each lip being externally convex and tapering in thickness, the free edges of the lips being opposed to each other and concentric, and in a plane perpendicular to the axis of the joint, and being spaced to provide a narrow, annular slot, through which pressure fluid, leaking through the joint between said vessel parts, may enter the chamber in the ring and thereby flex said lips away from each other, so that the outer convex face of each lip makes a tangential line contact with the respective seal-seating surfaces of the pressure vessel parts, thereby establishing a unit pressure at said tangent lines exceeding the pressure of the fluid medium, and a preloading device movable relatively to said vessel parts, which is operative to apply mechanical force to the sealing ring in a direction parallel to the axis of the ring, so as to establish sealing contact between the lips and said seal-seating surfaces of the pressure vessel parts even though the fluid pressure, against which the joint is to be sealed, is insufficient, of itself, to flex the stiffly resilient lips of the ring enough to provide a tight joint.

10. A high-pressure sealing device according to claim 9, further characterized in that the preloading device comprises a pressure-applying ring coaxial with the sealing ring and which is movable, relatively to said vessel parts, and means whereby the pressure-applying ring may be applied to or removed from the assembled vessel parts without disturbing the means which connects said vessel parts.

11. A high-pressure sealing device for sealing an annular joint between independent rigid parts of the wall of a metallic vessel designed to contain high-pressure, high-temperature fluid, connecting means whereby said parts may be drawn into metal-to-metal contact, said parts having external, coaxial, annular seal-seating surfaces located respectively, at opposite sides of the joint, and wherein a stiffly resilient metallic sealing ring, coaxial with the joint, contacts both of said seal-seating surfaces, said ring having an internal annular chamber of substantially toric configuration, and a continuous annular slot providing an entrance to said chamber and which is coaxial with and registers with the joint between the parts of the wall of said vessel, the ring being symmetrical, at any radial section, with respect to a line which is parallel to the axis of the ring, and which bisects said slot, and wherein the wall of said annular chamber is defined, in part, by annular lips which are integral portions of the ring, and whose free edges are opposed to each other and define said annular slot, and wherein said lips flex away from each other in response to a sufficiently high fluid pressure within said annular chamber, said lips having concave inner surfaces and tapering in thickness toward said slot, and wherein the interior chamber is of substantially toric configuration, and each lip has a convex outer face which makes a substantially line contact with one of the respective seal-seating surfaces of the pressure vessel parts, the aggregate of the areas of contact between said outer convex faces of the lips and the said sealing-seating surfaces being less than the combined areas of the internal surfaces of said lips, whereby fluid pressure, acting upon said interior surfaces, will force said convex outer faces of the lips against the seal-seating surfaces with a unit pressure exceeding the fluid pressure.

12. A high-pressure sealing device for sealing a joint between two independent rigid parts of the wall of a metallic pressure vessel designed to contain high-pressure, high-temperature fluid, means for applying mechanical force whereby said parts may be brought into metal-to-metal contact so as to minimize the width of the joint between them, said parts having seal-seating surfaces located respectively, at opposite sides of the joint, and wherein a stifly resilient metallic sealing ring contacts both of said seal-seating surfaces, said ring having an internal annular chamber whose wall is defined, in part, by annular lips which are integral portions of the ring and which flex away from each other in response to a sufficiently high fluid pressure within said interior chamber, each lip being externally convex and tapering in thickness, the free edges of the lips being opposed to each other and spaced to provide a narrow, continuous annular slot through which pressure fluid, leaking through the joint between said vessel parts, may enter the chamber in the ring and thereby flex said lips away from each other so that the outer convex face of each lip makes a tangential line contact with the respective seal-seating surfaces of the pressure vessel parts, thereby establishing a unit pressure at said tangent lines exceeding the pressure of the fluid medium, the parts of the pressure vessel being so shaped that the sealing ring may be assembled with the pressure vessel after said parts have been brought into contact by said force-applying means, and a preloading device movable relatively to said vessel parts and which is operative to apply mechanical force to the sealing ring, after the latter has been assembled with the vessel, in a direction parallel to the axis of the ring, so as to establish sealing contact between the lips and said seal-seating surfaces of the pressure vessel parts even though the fluid pressure, against which the joint is to be sealed, is insufficient, of itself, to flex the stiffly resilient lips of the ring enough to provide a tight joint.

13. In combination with two independent, closely adjacent, substantially rigid, normally stationary connected metallic parts which are exposed to pressure fluid which tends to escape through the joint between opposed faces of said parts, means for applying mechanical force whereby said parts may be so drawn together as to make metal-to-metal contact, each of said parts having an external seal-seating surface, said surfaces being at opposite sides, respectively, of the joint between said opposed faces, sealing means operative to prevent escape of fluid from between said rigid parts, the sealing means being external to said rigid parts and comprising a unitary member, symmetrical in shape relatively to the joint between said opposed faces, and having external surfaces, each of which makes an approximately line contact with one, respectively, of said seal-seating surfaces, said sealing member having an interior chamber and an elongate slot leading to said interior chamber, said slot registering with the joint between said opposed faces of said rigid parts, so that pressure fluid, which escapes into the joint between said opposed faces of the rigid parts, may enter said interior chamber of the sealing member, the area of the wall of said chamber of the sealing member, which is exposed to the pressure fluid, exceeding the collective area of contact of said external surfaces with the seal-seating surfaces, said sealing member being a mass of stiffly resilient metal and of a shape such that, when the pressure fluid enters said interior chamber, the sealing member is thereby so expanded that its exterior surfaces press against the respective seating surfaces with a unit pressure exceeding that of the pressure fluid, and means for removably holding the sealing member in assembled relation to the connected rigid parts.

References Cited in the file of this patent

UNITED STATES PATENTS

| | | |
|---|---|---|
| 631,661 | Perry | Aug. 22, 1899 |
| 2,036,801 | Fitzgerald | Apr. 7, 1936 |
| 2,321,791 | Beardsley | June 15, 1943 |
| 2,360,731 | Smith | Oct. 17, 1944 |
| 2,587,405 | Stevens | Feb. 26, 1952 |
| 2,748,453 | Haldeman | June 5, 1956 |

FOREIGN PATENTS

| | | |
|---|---|---|
| 3,068 | Great Britain | Oct. 17, 1872 |